Oct. 3, 1961   B. KOSTYSHYN   3,003,105
THREE LEAD HALL PROBES
Filed June 29, 1959

INVENTOR
BOHDAN KOSTYSHYN
BY
AGENT

United States Patent Office 3,003,105
Patented Oct. 3, 1961

3,003,105
THREE LEAD HALL PROBES
Bohdan Kostyshyn, Apalachin, N.Y., assignor to International Business Machines Corporation, New York, N.Y., a corporation of New York
Filed June 29, 1959, Ser. No. 823,704
5 Claims. (Cl. 324—45)

The invention relates to Hall probes.

The principal object of the invention resides in the provision of an improved Hall probe for mapping magnetic fields heretofore considered unmappable by means of Hall probes of the prior art.

A more specific object resides in the provision of a 3-lead Hall probe for mapping, or sensing, extremely small fields such as are encountered on magnetic media; for example, tape, drum, or the like.

Another specific object resides in an improved probe whereby fields heretofore considered inaccessible may be mapped by virtue of the fact that the improved Hall probe possesses an unlimited freedom of orientation not possessed by prior art Hall probes.

The foregoing and other objects, features and advantages of the invention will be apparent from the following more particular description of preferred embodiments of the invention, as illustrated in the accompanying drawings.

In general, the Hall probe is utilized to measure, map, or sense magnetic fields, particularly extremely small fields having magnitudes as low as 1 to 2 oersteds and up.

When the probe is influenced by mutually perpendicular electric current and magnetic forces, it yields a Hall output voltage in accordance with the following expression:

$$V_h = \frac{R_h B I}{t}$$

The Hall voltage $V_h$ is a function of the Hall coefficient $R_h$, the magnetic field B, the current I, and the reciprocal of the thickness of the sensitive portion of the probe.

Figure 1:
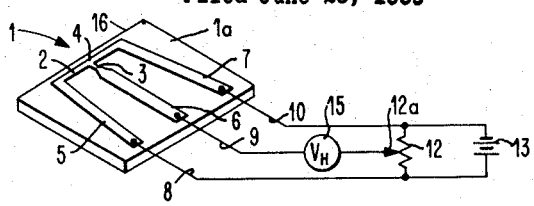
FIG. 1 is an isometric view of the improved Hall probe and associated electrical circuitry.
Figure 2:
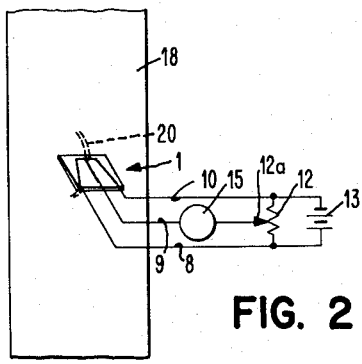
FIG. 2 shows the manner of mapping, or measuring, a magnetic bit on a tape by means of the present invention.

The improved 3-lead Hall probe 1 is shown in FIG. 1 where it is constituted of thin glass, or the like, having a flat surface upon which is an adherent configured thin layer of semiconductor material. The configuration, resembling a T shape, is constituted of an arm 2, an arm 3 at right angles therewith, and a sensitive area 4 which yields a maximum Hall voltage when influenced by concurrent and mutually perpendicular electric current and magnetic forces. The arm 2 has integral extensions 5 and 6. The vertical arm 3 has an integral extension 7. At the terminal ends of these extensions are lead lines 8, 9 and 10. Connected across the lines 8 and 10 is a potentiometer 12 having a slider 12a and a current source 13. Between the slider 12a and the line 9 is a voltmeter 15 for indicating the Hall voltage.

Figure 3:
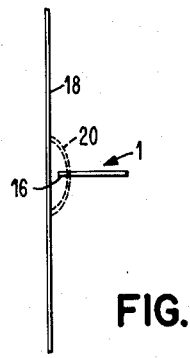
FIGS. 3 and 4 show sectional views of the probe in mapping minute magnetic fields on tape and drum, respectively.
Figure 4:
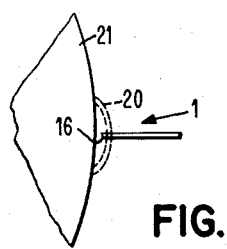

Typical values of resistance for the probe and potentiometer are 10 ohms and 100 ohms, respectively. The current source 13 should be capable of providing a current through the probe of several milliamperes when the probe is subjected to the influence of a magnetizing force of below 100 oersteds. Under these conditions, the probe will yield a Hall output voltage in the range of several microvolts or less down to the noise level of the instrumentation used. FIGS. 3 and 4 show how the probe may be used for measuring fields emanating from discrete magnetized spots on the surface of a tape 18 and the surface of a drum 21. As seen in FIGS. 3 and 4, the front edge of the probe 1 may be moved into contact with the surface of the media bearing the magnetized areas. This is possible by virtue of the fact that the front edge 16 of the probe is free of any lead connectors. The sensitive area 4 of the probe 1, seen in FIG. 1, may be brought as close to the leading edge 16 as is physically practically possible. The chief advantage of the present probe lies in the fact that it can be oriented to measure fields parallel to surfaces from which they emanate.

Figure 5:
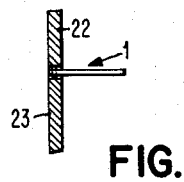
FIG. 5 shows how the Hall probe is employed to map fields in restricted or confined locations.

FIG. 5 shows how the probe 1 may be conveniently used to measure or map a field located between pole faces 22 and 23 having an extremely small gap therebetween in the order of thousandths.

Figure 6:
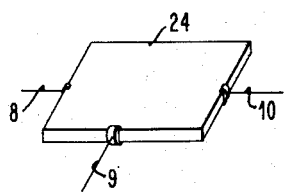
FIG. 6 shows 3-lead connections to a Hall sensitive probe constituted of a thin slab, or a crystal, of semiconductor material.

Probes constituted of thin slabs or single crystals of semiconductor materials may have leads connected thereto in the manner taught by the invention. A probe constructed in this manner is shown in FIG. 6. The vital or sensitive region of this probe is constituted of a thin slab 24 of semiconductor material to which leads 8 and 10 are secured in a well-known manner; the connections between the leads and the slab 24 are presumed to lie on a horizontal axis of the probe. The Hall voltage lead is secured at a point which is presumably on an axis which is vertical to the horizontal axis of the probe.

Although a variety of semiconductors and metals may be employed in the structures of Hall probes, the following have given useful results, namely: bismuth, germanium, indium arsenide and indium antimonide.

Although the particular configuration shown in FIG. 1 is highly desirable, the invention may be applied to probes having other configurations; for example, crossshaped, to the arms of which leads may be directly connected in the manner well known in the art.

In the 3-lead Hall probes shown, the fourth lead is represented by the connection to and including the slider 12a on the potentiometer 12. The slider is adjusted to obtain a zero volt reading on the meter 15 in the absence of a magnetic field. Under this condition, the slider and its connection line may be considered the equivalent of the fourth lead of a conventional-type Hall probe.

While the invention has been particularly shown and described with reference to preferred embodiments thereof, it will be understood by those skilled in the art that various changes in form and details may be made therein without departing from the spirit and scope of the invention.

What is claimed is:

1. A Hall probe comprising: a thin flat substrate of glass, or the like, having a flat surface and at least one straight edge; a thin layer of semiconductor in the form of a T adhering to a portion of said surface, the horizontal portion of the T lying parallel to said straight edge; a pair of current leads secured to said thin layer at opposite points lying on a horizontal axis passing through the horizontal portion of the T; and a Hall voltage lead secured to said thin layer at a point lying at the base of the vertical portion of the T.

2. A Hall probe comprising: a thin flat substrate of glass, or the like, having a flat surface and at least one straight edge; a thin layer of semiconductor in the form of a T adhering to a portion of said surface, the horizontal portion of the T lying parallel to and close to the straight edge; a pair of current leads secured to said thin layer at opposite points lying on a horizontal axis passing through the horizontal portion of the T; and a Hall voltage lead secured to said thin layer at a point lying at the base of the vertical portion of the T.

3. A Hall probe comprising: a thin flat substrate of glass, or the like, having a flat surface and at least one straight edge; a thin layer of semiconductor in the form of a T adhering to a portion of said surface, the horizontal portion of the T lying parallel to and substantially adjacent the straight edge; a pair of current leads secured to said thin layer at opposite points lying on a horizontal axis passing through the horizontal portion of the T; and a Hall voltage lead secured to said thin layer at a point lying at the base of the vertical portion of the T.

4. A Hall probe comprising: a thin flat substrate of glass, or the like, having a flat surface and at least one straight edge; a thin layer of semiconductor in the form of a T adhering to a portion of said surface, the horizontal portion of the T lying parallel to and close to the straight edge; a pair of current leads secured to said thin layer at opposite points lying on a horizontal axis passing through the horizontal portion of the T; a potentiometer connected across said current leads; and a Hall voltage lead secured on one end to an adjustable slider on said potentiometer and on the opposite end to a point lying at the base of the vertical portion of the T.

5. A Hall probe comprising: a thin flat substrate of glass, or the like, having a flat surface and at least one straight edge; a thin layer of semiconductor in the form of a T adhering to a portion of said surface, the horizontal portion of the T lying parallel to and substantially adjacent the straight edge; a pair of current leads secured to said thin layer at opposite points lying on a horizontal axis passing through the horizontal portion of the T; a potentiometer connected across said current leads; and a Hall voltage lead secured on one end to an adjustable slider on said potentiometer and on the opposite end to a point lying at the base of the vertical portion of the T.

References Cited in the file of this patent

UNITED STATES PATENTS

| | | |
|---|---|---|
| 2,562,120 | Pearson | July 24, 1951 |
| 2,866,013 | Reis | Dec. 23, 1958 |
| 2,906,945 | Weiss | Sept. 29, 1959 |
| 2,914,728 | Brophy | Nov. 24, 1959 |